Aug. 21, 1956 O. H. SCHADE 2,760,008

AMPLIFIER HAVING CONTROLLABLE SIGNAL EXPANSION AND COMPRESSION CHARACTERISTICS

Filed Aug. 30, 1950 2 Sheets-Sheet 1

INVENTOR
Otto H. Schade
BY
ATTORNEY

Aug. 21, 1956 O. H. SCHADE 2,760,008

AMPLIFIER HAVING CONTROLLABLE SIGNAL EXPANSION AND COMPRESSION CHARACTERISTICS

Filed Aug. 30, 1950

2 Sheets-Sheet 2

INVENTOR
Otto H. Schade
BY
ATTORNEY

United States Patent Office 2,760,008

Patented Aug. 21, 1956

2,760,008

AMPLIFIER HAVING CONTROLLABLE SIGNAL EXPANSION AND COMPRESSION CHARACTERISTICS

Otto H. Schade, West Caldwell, N. J., assignor to Radio Corporation of America, a corporation of Delaware Application August 30, 1950, Serial No. 182,208

4 Claims. (Cl. 179—171)

The present invention relates to improvements in signal processing circuits and methods, and more particularly, although not necessarily exclusively, to electrical circuits for correcting the wave form characteristics of communications signals.

More directly the present invention relates to signal correction amplifiers for use in television systems to correct the overall brightness-transfer characteristic of the television channel in which the correction circuit is placed. Such correction amplifiers have in the prior art been sometimes referred to as gamma correction amplifiers.

In the communications art, it often becomes necessary to alter or reshape existing electrical signals into forms more suitable for the particular purpose or need at hand. Sometimes electrical signals in passing through electronic amplifiers actually suffer distortion which must later be corrected before the signal becomes useful.

By way of example, consideration may be given to video signals found in the television art. It is well known that one extremity of video signal excursion corresponds to black or dark picture information while the other and opposite extremity corresponds to white or light picture information. The video signal representative of a logarithmic grey scale or light wedge used in photographic work may take the form of a signal having linear increments of amplitude between two potential levels. This signal will, in turn, produce logarithmic light increments on a kinescope screen. Arbitrarily, such a video signal may, in a certain amplifier stage, represent white picture information by low amplitude levels while depicting black picture information by high amplitude levels relative to some fixed datum.

It can then be seen that should this signal suffer electrical compression at either of its extremities due to non-uniform amplifier characteristics, or should it suffer an unwarranted compression or distortion by the transfer characteristic of the camera tube or kinescope, the overall linearity of the brightness relations defined by the signal will be destroyed, and the resulting picture information defined by the signal will no longer be a faithful reproduction of the original scene, or in this case, the grey scale. It is therefore frequently necessary to modify the transfer characteristic of the video amplifier to compensate curvature distortion occurring in the camera tube or kinescope. By and large, the most common distortion encountered in the television art is compression of the whites and blacks of the signal.

The need for amplitude correction amplifiers in the television art is quite fully discussed in an article entitled "Gamma and range in television" by I. G. Maloff appearing in the RCA Review for April 1939.

In the prior art, it is common practice to correct the amplitude of electrical signals by processing the signal through a stretching or compression amplifier. For example, U. S. Patent 2,222,933, A. D. Blumlein, entitled "Thermionic Amplifier" issued November 26, 1940, shows a simple gamma correction circuit for video signals and the like. This amplifier provides one degree of amplification for low amplitude signal variations and a higher degree of amplification for high amplitude signal variations. Should then a video signal in passing through a non-linear system element suffer compression at its upper extremity thereby causing black compression in the reproduced picture, such a corrective amplifier, as described by Blumlein, could be used to restore the signal wave form to normal.

Oftentimes in signal amplifying or reproducing systems, amplitude compression occurs at both the signal extremities at the same time. In television work, this would mean that both the whites and blacks of the picture, as represented by a given video signal, would be compressed. Under such circumstances, there arises the need for an amplitude correction circuit which allows separately controllable correction for both the upper and lower extremities of the video signals so that both the whites and the blacks of the signal may be stretched enough to overcome the distortion produced by compression.

To obtain separately controllable correction action at both extremities of the video signal, the most common prior art arrangement has been to cascade two or more correction amplifier circuits, each correction circuit being of the type which operates only on one extremity of the video signal. Thus, consider the use of two of the above-referenced Blumlein correction circuits each operating to expand the positive-going extremity of an applied signal and both amplifiers connected directly in cascade. The positive-going extremity of the signal would then be expanded by the first correction amplifier which would, in turn, reverse the phase of the signal to allow the second amplifier to effectively expand the negative-going extremity of the original signal.

The major difficulty with such prior art arrangements arises from the fact that as the gain of the first cascade amplifier is altered, the signal amplitude applied to the second cascade amplifier is also changed. This means that although separate controls are ostensibly provided, by way of example, for the whites and blacks of a video signal, such controls are not mutually exclusive of one another. Moreover a cascade system of correction, such as described, obviously requires a plurality of vacuum tubes and generally results in rather complicated and relatively expensive circuit arrangements. Furthermore, in such cascade systems, the characteristics of signal expansion are not always as versatile and easily shaped to fully correct for existing types of distortion as might be desirable.

Another general disadvantage of most prior art wave form correction circuits, particularly of the television gamma-correcting variety, is the fact that regardless of whether correction is being carried out at either or both the extremities of the applied signal, such correction is undesirably dependent upon the amplitude of the applied signal. Under such conditions, should an applied video signal change in amplitude, the type of correction applied to the whites or blacks of the signal would apparently change.

It is therefore an object of the present invention to provide an improved wave form correcting circuit which allows separate and independent control of the correction applied both at positive and negative-going extremities of a given signal.

It is another object of the present invention to provide a wave form correcting circuit which permits more versatile control of the correction characteristics applied to the extremities of a given signal requiring correction.

It is further an object of the present invention to provide a simple and inexpensive wave form correction circuit for processing video signals so that the whites and the blacks of the signal may be separately and independently stretched or expanded.

It is a still further object of the present invention to provide a signal correcting circuit for refashioning the wave form characteristics of the extremities of an applied signal in such a way as to be virtually independent of moderate amplitude changes in the applied signal.

In the realization of the above objects and features of advantage, the present invention contemplates the use of an electronic amplifier provided with controllable degeneration so that the effective gain of the amplifier may be easily controlled. Amplitude detecting circuits responsive to the opposite extremities of the applied signal are then employed to decrease the degeneration in the amplifier at both the negative and positive extremities of the signal. This will then produce expansion or stretching of the applied signal at its opposite extremities. In one embodiment of the present invention, oppositely polarized diodes are connected in shunt with a cathode resistance of the amplifier tube. One diode is biased to conduct during positive-going extremities of an applied signal while the other diode is biased to conduct only during negative-going extremities of an applied signal. By varying the impedance in series with each diode, the curvature of the positive and negative expansion may be easily controlled.

With such an arrangement, the present invention further contemplates the use of an automatic gain control circuit which is responsive to the signal appearing across the degenerative network to control the gain of a regular amplifier immediately preceding and driving the correction amplifier. Thus, should any change in the amplitude of the applied signal occur, the automatic gain control circuit will maintain the input to the correction amplifier at such a level as will sustain the desired character of expansion or stretching of opposite signal excursion extremities.

A more complete understanding of the present invention, as well as further objects and features of advantage, will become apparent through the reading of the following description especially when taken in connection with the accompanying drawings in which.

Figure 1:
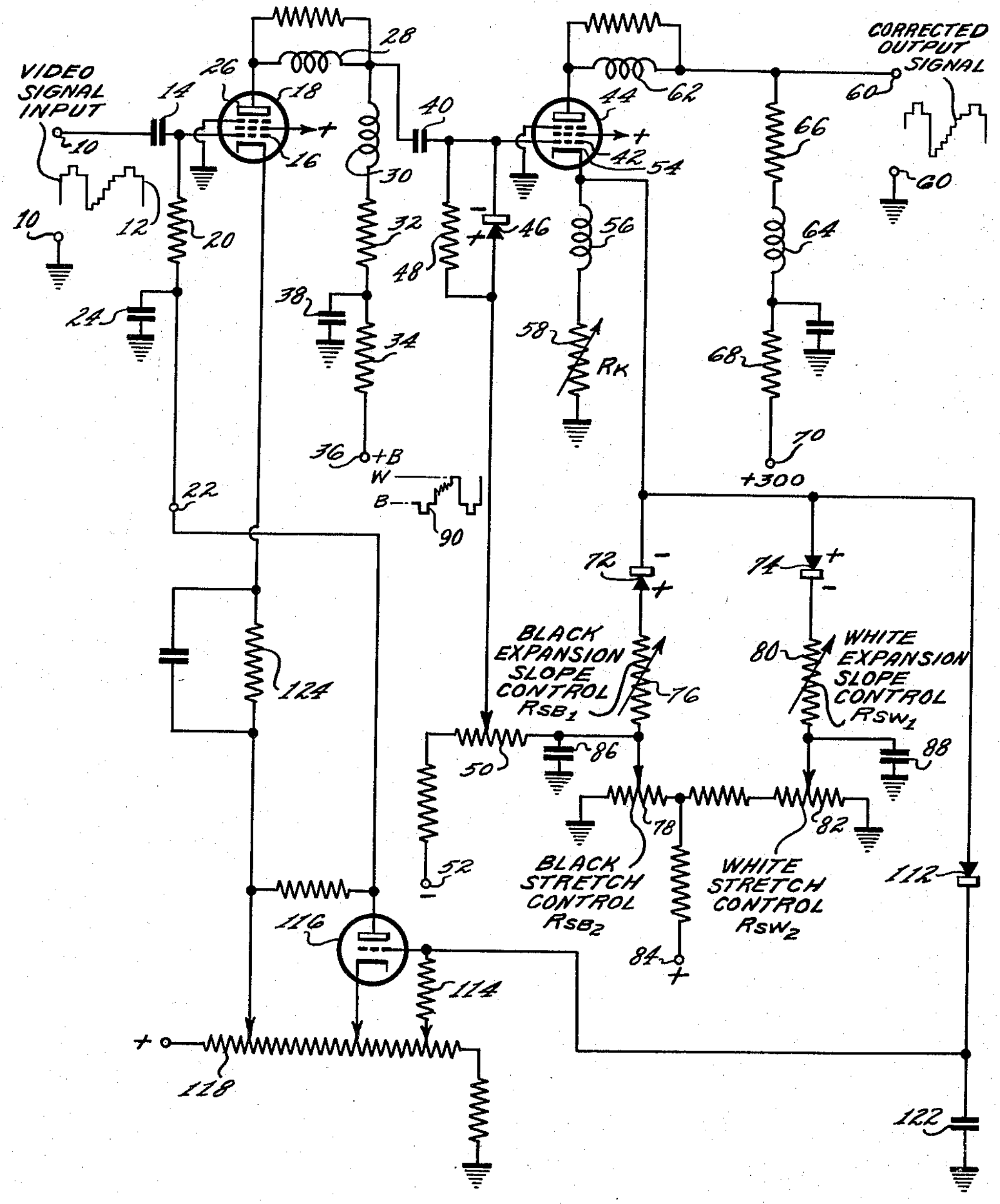
Figure 1 is a schematic representation of the present invention in the form of a gamma correction circuit for video signals.

Turning now to Figure 1, there is indicated at 10 a set of input terminals for receiving the electrical signals whose wave form is to be corrected as described above. By way of example, a video signal such as 12 will be considered. The signal 12 is capacitively coupled via capacitor 14 to the grid 16 of electron discharge tube 18. The tube 18 is connected as a variable gain amplifier suitable for control by AGC potentials. As shown, the AGC potential may be applied to the control grid 16 through a resistor 20 which is connected to the gain control input terminal 22. By-passing capacitor 24 is provided to bring the terminal 22 to A. C. ground potential. The type of gain control potential applied to the terminal 22 and its manner of development forms a part of the present invention and will be described hereinafter. The anode 26 of the tube 18 is connected through peaking inductances 28 and 30, as well as resistors 32 and 34, to a source of positive B potential having a terminal at 36. A decoupling capacitor 38 is also appropriately provided.

The amplified video signal appearing at the output of the amplifier discharge tube 18 is then capacitively coupled via capacitor 40 to the control grid 42 of the gamma correction amplifier tube 44. A unidirectional conducting device in the form of an electronic diode or crystal diode is shown at 46 as being connected with the control electrode 42 for the purpose of clamping the incoming video signal to establish D. C. picture information at the input electrode 42 of the amplifier 44. A diode load resistance 48 is appropriately provided, the lower end of which is connected through the potentiometer 50 to a source of negative potential having a terminal at 52. The cathode 54 of the tube 44 is connected with ground potential through inductance 56 and cathode resistor 58. Inductance 56 acts to compensate for the additional stray circuit capacity placed in shunt with the cathode-to-ground circuit by merit of the present invention about to be described. Output signals from the amplifier 44 are available across the terminals 60 by merit of the frequency corrected load circuit comprising inductance 62, inductance 64 and resistance 66 connected through decoupling resistor 68 to a source of +B potential having a terminal at 70.

According to the present invention, as described hereinabove, the degeneration in the gamma correction amplifier tube 44 is controlled by varying the impedance of the cathode-to-ground path of the discharge tube. In the embodiment of the invention shown in Figure 1, this is carried out by the present invention through the provision of unilateral conduction devices 72 and 74 oppositely polarized with respect to one another. These unilateral conduction devices may take any desirable form such as diodes, triodes, tetrodes, pentodes, or other variable resistance conductance devices. For purposes of simplicity, they will be referred to as diodes. The diode 72 is connected in shunt with the cathode ground path of the tube 44 through variable resistance 76 and a portion of the potentiometer 78. The oppositely poled diode 74 is similarly connected in shunt with the cathode ground path of the discharge tube 44 through variable resistance 80 and a portion of the potentiometer 82. Both of the potentiometers 78 and 82 form a part of a bleeder-to-ground system across the positive power supply terminal shown at 84. Potentiometer 78 also forms a part of a bleeder-to-ground system for the negative power supply terminal shown at 52. By-pass condensers 86 and 88 maintain the respective arms of the potentiometers 78 and 82 at A. C. ground potential regardless of their static D. C. potential.

Figure 2:
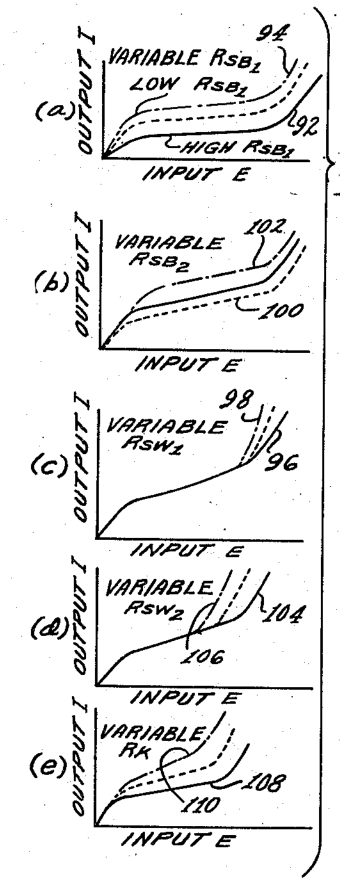
Figure 2 is a graphic representation of certain electrical characteristics of the embodiment of the present invention shown in Figure 1.

The operation of the present invention thus far described is best understood with the aid of the curves of Fig. 2. The curves in Figure 2 represent plots of signal output current causing a linearly proportional signal at terminals 60 in Fig. 1 vs. the instantaneous input voltage appearing at the grid 42 of the discharge tube 44. The potentiometers 78 and 82 are initially adjusted so that the bias on the diode 72 is such to render it normally or statically conducting. The diode 74 is biased and polarized so that it is non-conducting under zero signal conditions. The video signal appearing at the grid 42 of the amplifier 44 will necessarily be of sync negative polarity so that black picture information will be represented by negative excursions of the signal. As the signal, indicated by way of example at 90, rises from a black to white level, that is rises in the positive direction, the potential of the cathode 54 of the discharge tube 44 will also rise in a positive direction.

Thus, in accordance with the present invention, the gain of the gamma correction amplifier 44 for low signal and no-signal conditions will be some nominal figure, depending upon the value of the impedance connected in series with the conducting diode 72. As the signal becomes more positive or "whiter," the diode 72 will at some point (set by the potentiometer 78) cease conducting. At this time, degeneration in the cathode circuit of the amplifier 44 will be maximum and determined by resistor 58 since neither of the diodes 72 nor 74 will be conducting. As the signal goes even "whiter" or more positive, the cut-off bias on the diode 74 (set by potentiometer 82) will be overcome and this diode will conduct. Depending upon the value of the resistance in series with the diode 74, the gain of the amplifier will be then increased to a certain level. Thus, the gain of the amplifier 44 will be increased for blacks and whites and will be reduced for signals intermediate these two levels. This means that the whites and the blacks are stretched or expanded as described hereinabove.

The versatility of the correction available by means of the arrangement shown in Fig. 1, as well as a better understanding of its operation, may be obtained by closer reference to Figure 2. In Figure 2*a*, the effects are shown of varying the variable resistance 76 labelled as the Black Slope Control ($R_{SB_1}$). Since resistance 76 controls the impedance in shunt with the cathode circuit during the conduction of diode 72, the gain of the stage during black expansion may also be controlled thereby. Curve 92 in Figure 2*a* shows the correction characteristic provided by a high value of resistance 76, while curve 94 indicates the characteristic obtained by a low value of resistance 76. Similarly, curve 2*c* illustrates the effects of varying the resistance 80 which is in series with diode 74. Resistance 80 is labelled White Expansion Control ($R_{SW_1}$). Curve 96 illustrates the characteristic obtained with a high value of resistance 80 while curve 98 illustrates the characteristic obtained by a low value of resistance 80. Thus, the amounts of expansion of the whites and the blacks are rendered separately controllable.

Potentiometers 78 and 82 respectively control the bias on the diode 72 and 74. Thus, these potentiometers determine the point at which the diodes 72 and 74 respectively conduct to provide black and white expansion. The effects of varying the potentiometers 78 and 82 are as shown in Figures 2*b* and 2*d*. Potentiometer 78 is labelled Black Stretch Control ($R_{SB_2}$). Curve 100 in Figure 2*b* shows the characteristic obtained with the tap of potentiometer 78 moved in a more negative direction while curve 102 illustrates conditions when the tap on potentiometer 78 is made more positive. Likewise, in Figure 2*d*, curve 104 illustrates conditions obtained when the arm of potentiometer 82 is made more positive; while the curve 106 shows the characteristic obtained when the tap on the potentiometer 82 is made more negative. The curve in Figure 2*e* illustrates the effects of varying the resistance $R_k$ in the cathode circuit of the tube 44. Curve 108 corresponds to a high value of $R_k$, while curve 110 corresponds to a low value of $R_k$.

The type of signal correction obtained by a given setting of the controls hereinabove discussed will, of course, be the same for any type of applied signal provided the peak-to-peak amplitude of the signal as sampled across the degenerative circuit is the same. Therefore, in accordance with the present invention, a rectifier such as 112 is connected in shunt with the cathode circuit to form a peak rectifier circuit. Rectified voltage representing the positive-going extremities of the signal appearing at the cathode 54 will be developed across the resistance 114. The discharge tube 116 is connected along the bleeder 118 as a conventional D. C. amplifier to amplify and reverse the sense of voltage variations appearing across resistance 114. Thus, as the peak-to-peak amplitude of the signal appearing across the degenerative network of the amplifier 44 increases, the voltage across 114 will also increase in a positive direction. This will cause the anode of the tube 116 to become more negative and appropriately reduce the gain of the amplifier 18. This decrease in gain, if properly proportioned, will maintain the signal amplitude across the cathode load circuit of tube 44 substantially constant. A time constant capacitor 122 is provided to decrease the speed with which the AGC circuit responds. The cathode of the amplifier tube 18 is, of course, connected through the bypassed cathode resistor 124 to an established point on the bleeder 118.

Figure 3:
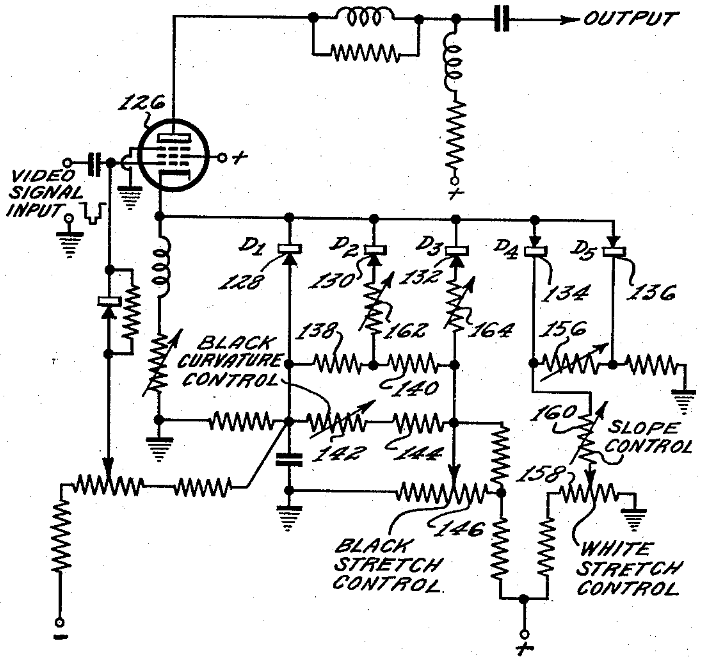
Figure 3 is another form of the present invention which permits more versatile control of the type of wave form correction applied to the opposite extremites of an incoming signal.

Another embodiment of the present invention which provides even more versatile control of the expansion and stretching characteristics of the correction amplifier is shown in Figure 3. Here the correction amplifier tube 126 is connected substantially in the same manner as that shown in Figure 1. The major difference between Figure 1 and Figure 3 resides in the arrangements provided for by-passing the degenerative cathode circuit of the amplifier 126. Comparison of Figure 3 with Figure 1 will reveal that the black expansion diode 72 of Figure 1 has been replaced by three diodes D1, D2, and D3 respectively shown at 128, 130, and 132. Similarly, the white expansion diode 74 of Figure 1 has been replaced by diodes D4 and D5 respectively shown at 134 and 136. The diodes 128, 130, and 132 controlling black expansion have all their cathodes connected with the cathode of the amplifier 126, while their anodes are connected to different positions along a bleeder system comprising resistors 138 and 140. These resistances may be made higher in value compared to the resistances 142 and 144. The use of a plurality of diodes, in accordance with the present invention, provides a smoother and more flexible control of the signal expansion curvature imposed by the system. The Black Stretch Control 146 is substantially the same as the control 78 in Figure 1 and acts to control the overall bias applied to the diode combination D1, D2 and D3, and hence the point at which this combination circuit, as a whole, becomes non-conducting. The Black Curvature Control 142 of Figure 3 determines the potential difference between the anode of diode D1 and the anode of D3 for any given bias condition established by the stretch control 146.

Figure 4:
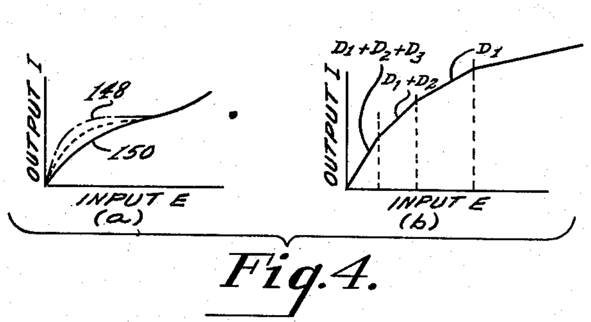
Figure 4 is a graphic representation of certain electrical characteristics of the embodiment of the present invention shown in Figure 3.

The conditions thereby obtained are illustrated by Figure 4*b*. It is seen that for any given setting of the Black Stretch Control 146, the first diode to release conduction, as the signal on the grid of the amplifier 126 swings more positively, will be the diode D1. As the input signal swings more positively, diode D2 will drop out and leave only the diode D3 conducting. Eventually, the signal will become sufficiently positive to overcome the bias on the diode D3 so that none of the diodes will act to by-pass the degenerative cathode circuit of the amplifier. By increasing the value of the black curvature control 142, the potential differential between diodes D1 and D2, as well as D2 and D3, as described, will be increased. By reducing the value of the shunt resistor 142, the potential differentials between diodes D1, D2 and D3 will decrease. In the limit as resistance 142 is made exertmely small, operation will approach the conditions shown in Figure 1. Thus, Figure 4*a* shows the effects of operating the Black Curvature Control 142. Curve 148 shows the characteristic for a low resistance value of curvature control 142 while curve 150 illustrates the characteristic obtained by a high resistance value of curvature control.

The novel arrangement for establishing a voltage differential between the diodes in the black expansion circuit, of course, is useful to obtain versatility in the white expansion circuit of Figure 3. Thus, variable resistance 156 will act as a White Curvature Control in an analogous manner to variable resistor 142 of the same figure. The White Stretch Control 158 merely controls the bias on the diodes D4 and D5 and is comparable to potentiometer 82 in Figure 1 previously described. A variable resistance such as 160 may be added to control the maximum slope provided by the simultaneous conduction of diodes D4 and D5. Variable resistances 162 and 164 may similarly be placed in series with any of the black expansion diodes such as, for example, D2 and D3 for controlling the individual slope produced by the conduction of the corresponding diodes.

From the foregoing, it is seen that the present invention has provided a new and useful signal correction circuit which allows extremely versatile control of the type of correction imposed by the circuit. Furthermore, it is seen that through the use of the peak detecting circuit and AGC system which controls the amplitude of applied signals in accordance with the voltage appearing across the degenerative branch of the correction amplifier circuit, a high degree of operational stability is obtained.

It will be understood that although for purposes of describing the present invention, specific tube structures and circuit arrangements have been discussed, the invention is in no way to be limited to the specific tube types or current bleeder arrangements illustrated.

Having thus described my invention, what I claim is:

1. In a signal processing circuit the combination of, an electron discharge tube having at least an anode, cathode and control electrode, an input circuit connected between said control electrode and said cathode, an output circuit connected between said anode and said cathode, an impedance common to said input and said output circuit, a first unilateral conduction means connected across at least a portion of said impedance with one polarity of connection, a second unilateral conduction means connected across at least a portion of said impedance with the opposite polarity of connection relative to said first unilateral conduction device, biasing means for biasing said first unilateral conduction means in a conducting state under no-signal conditions at said discharge tube input circuit, biasing means for biasing said second unilateral conduction means in a non-conducting state under said no-signal conditions.

2. In a signal processing circuit the combination of, an electron discharge tube having at least an anode, cathode and control electrode, an input circuit connected between said control electrode and said cathode adapted to receive input signals having at least low, medium and high amplitude portions, an output circuit connected between said anode and said cathode, an impedance common to said input and said output circuit, across which is developed an electrical version of the discharge tube input signals, a first unilateral conduction means connected across at least a portion of said impedance with one polarity of connection, a second unilateral conduction means connected across at least a portion of said impedance with the opposite polarity of connection relative to said first unilateral conduction device, biasing means for biasing said first unilateral conduction means to a conducting state only for low amplitude portions of applied input signal, biasing means for biasing said second unilateral conduction means into a non-conducting state for low and medium amplitude portions of applied signal but allowing conduction during high amplitude signal portions.

3. Apparatus according to claim 2 wherein said impedance comprises the series combination of at least a resistance and an inductance.

4. Apparatus according to claim 2 wherein means are additionally provided for controlling the amplitude of signal applied to said input circuit in accordance with an amplitude control potential, and means including a peak rectifying circuit connected with said discharge tube cathode for developing an amplitude control potential in accordance with the amplitude of signal developed across said impedance, and connections for applying said amplitude control potential to said amplitude controlling means.

References Cited in the file of this patent

UNITED STATES PATENTS

| | | |
|---|---|---|
| 2,227,056 | Blumlein et al. | Dec. 31, 1940 |
| 2,255,691 | Wilson | Sept. 9, 1941 |
| 2,299,945 | Wendt | Oct. 27, 1942 |
| 2,329,558 | Scherbatskoy | Sept. 14, 1943 |
| 2,361,634 | Koch | Oct. 31, 1944 |
| 2,434,155 | Haynes | Jan. 6, 1948 |
| 2,452,880 | Van Beuren | Nov. 2, 1948 |
| 2,549,761 | Adams | Apr. 24, 1951 |
| 2,554,905 | Hawkins | May 29, 1951 |
| 2,638,538 | Ruben | May 12, 1953 |

FOREIGN PATENTS

| | | |
|---|---|---|
| 412,126 | Great Britain | June 21, 1934 |